US008014362B2

(12) United States Patent
Panico et al.

(10) Patent No.: US 8,014,362 B2
(45) Date of Patent: Sep. 6, 2011

(54) METHOD FOR THE ASSIGNMENT OF SCRAMBLING CODES TO CELLS OF A CDMA CELLULAR MOBILE COMMUNICATIONS NETWORK

(75) Inventors: Massimiliano Panico, Turin (IT); Indro Francalanci, Turin (IT); Graziano Bini, Turin (IT); Michele Ludovico, Turin (IT)

(73) Assignee: Telecom Italia S.p.A., Milan (IT)

( * ) Notice: Subject to any disclaimer, the term of this patent is extended or adjusted under 35 U.S.C. 154(b) by 619 days.

(21) Appl. No.: 11/989,386

(22) PCT Filed: Jul. 28, 2005

(86) PCT No.: PCT/EP2005/008207
§ 371 (c)(1),
(2), (4) Date: Oct. 3, 2008

(87) PCT Pub. No.: WO2007/016933
PCT Pub. Date: Feb. 15, 2007

(65) Prior Publication Data
US 2009/0073939 A1 Mar. 19, 2009

(51) Int. Cl.
*H04B 7/216* (2006.01)
(52) U.S. Cl. .................. 370/335; 370/320; 370/342
(58) Field of Classification Search .................. 455/452, 455/446; 370/336, 208
See application file for complete search history.

(56) References Cited

U.S. PATENT DOCUMENTS

| 6,058,136 | A | 5/2000 | Ganesh et al. | |
| 6,618,432 | B1 | 9/2003 | Ganesh | |
| 2001/0041574 | A1* | 11/2001 | Bergenlid et al. | 455/452 |
| 2003/0087641 | A1* | 5/2003 | Gustafsson | 455/446 |
| 2004/0131007 | A1* | 7/2004 | Smee et al. | 370/208 |

OTHER PUBLICATIONS

Jung et al.; "Scrambling Code Planning for 3GPP W-CDMA Systems"; IEE VTC 2001, IEEE, US, vol. 4 of 4, Conf 53, pp. 2431-2434, (2001).

* cited by examiner

*Primary Examiner* — Dang T Ton
*Assistant Examiner* — Pamit Kaur
(74) *Attorney, Agent, or Firm* — Finnegan, Henderson, Farabow, Garrett & Dunner, L.L.P.

(57) ABSTRACT

A method for assigning scrambling codes in a code division multiple access cellular radio communications network includes a plurality of network cells covering a geographic area, including: determining, for each of the cells, a respective set of adjacent cells by: taking a first set of cells that are neighbors of the given cell; taking a second set of cells that are neighbors of neighbors of the given cell; taking a third set of cells that are neighbors of neighbors of neighbors of the given cell, wherein two cells are considered neighbors in case the respective coverage areas at least partially overlap; taking a fourth set of cells which, in at least one point of the best server are of the given cell, have an adjacent coefficient with the given cell higher than a predetermined threshold; combining the first, second, third and fourth set of cells; and assigning to each cell of the set of adjacent cells a scrambling code different from a scrambling code assigned to the given cell.

8 Claims, 10 Drawing Sheets

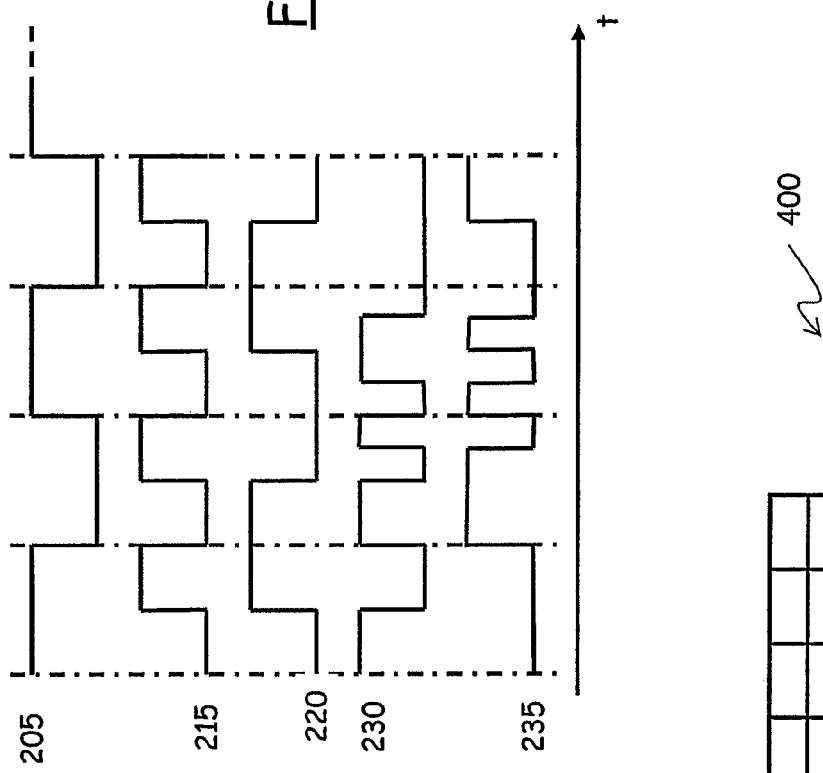
FIG. 2
FIG. 3
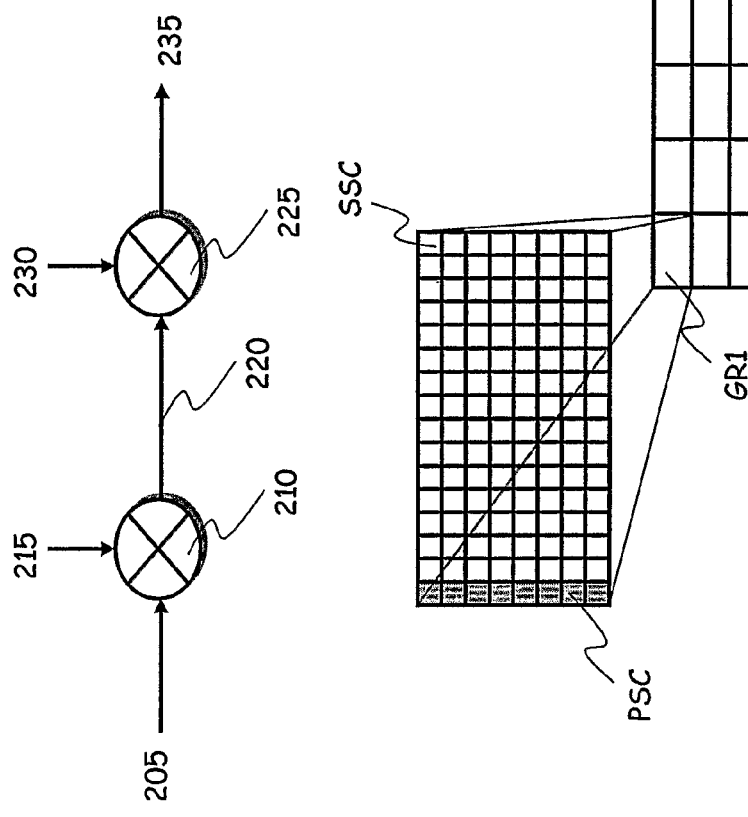
FIG. 4

FIG. 5
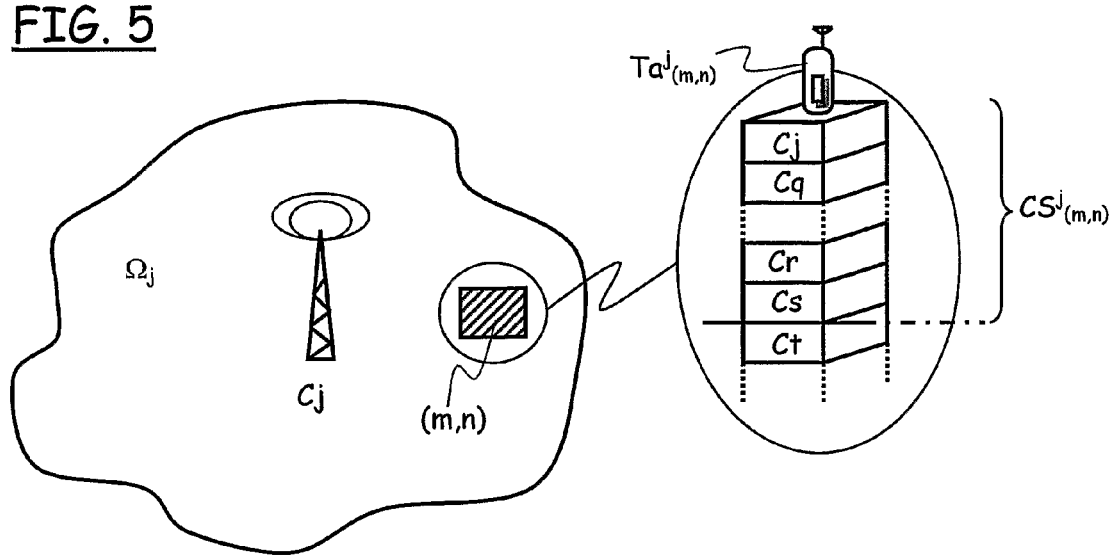
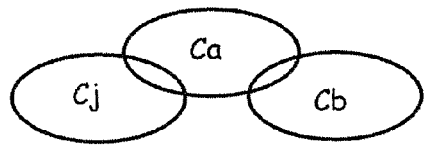
FIG. 6A
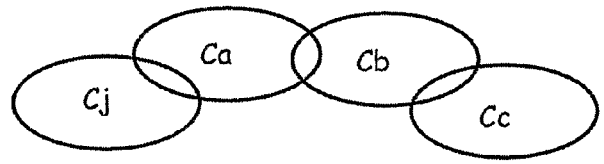
FIG. 6B
FIG. 6C
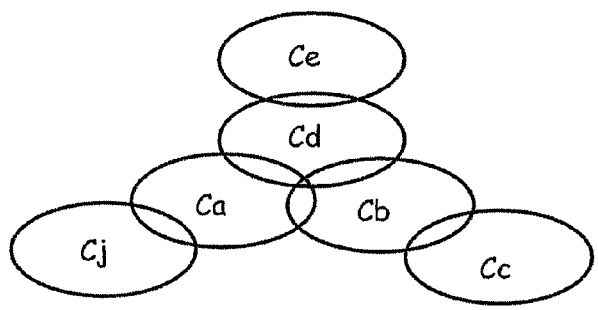
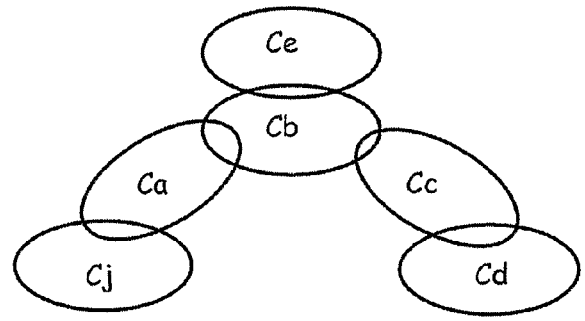
FIG. 6D (1st of 3)

(2nd of 3)

(3rd of 3)

(1ST OF 2)

(2ND OF 2)

METHOD FOR THE ASSIGNMENT OF SCRAMBLING CODES TO CELLS OF A CDMA CELLULAR MOBILE COMMUNICATIONS NETWORK

CROSS REFERENCE TO RELATED APPLICATION

This application is a national phase application based on PCT/EP2005/008207, filed Jul. 28, 2005.

FIELD OF THE INVENTION

The present invention generally relates to the field of telecommunications, particularly to mobile communications networks, allowing communications between mobile users. More specifically, the invention relates to cellular mobile communications networks that adopt a Code Division Multiple Access (CDMA) access scheme, such as cellular networks of the third generation.

BACKGROUND OF THE INVENTION

Cellular mobile communications networks have the peculiarity of featuring a plurality of so-called "network cells", where by the term cell there is intended the set of geographical "points", "pixels", in jargon (practically, small areas of, e.g., 50 m by 50 m, or 10 m by 10 m), which are covered by the radio electromagnetic signal irradiated by a generic common antenna. Cellular mobile communications networks thus provide coverage of a determined geographic region by means of the plurality of network cells.

Among the different types of cellular mobile communications networks, some networks have a radio access front end exploiting the CDMA access scheme to the shared (radio) communication medium. This is for example the case of third-generation cellular mobile communications networks, currently being deployed. One of the third-generation mobile communications standards is the so-called Universal Mobile Telecommunications System (UMTS), which is in particular the standard that has been adopted by operators in Europe.

CDMA is a technique of accessing a shared communications medium according to which a same frequency band (a "channel") is assigned simultaneously to all the requesting users; the discrimination among different signals intended for different users is accomplished by exploiting a coding scheme, according to which different codes are assigned to different users, and the signals directed thereto are coded using the respective codes.

The codes assigned to different users and exploited for coding the signals directed thereto need to be "orthogonal".

The coding process comprises a so-called "spreading" operation, according to which the bandwidth of the original (uncoded) signal is widened, in particular spread over a larger bandwidth, at the same time reducing the average signal power. The spreading is achieved by coding the signal using a code that contains a higher number of symbols than the number of bits to be transmitted; the coded signal thus has a symbol rate (the so-called "chip rate") higher than the bit rate of the original signal.

A "scrambling" process is further implemented, by applying a "scrambling code" to the signal after the spreading operation, with the purpose of scrambling the different symbols. The scrambling operation does not increase the signal bandwidth (the symbol rate is not changed compared to the chip rate of the spread signal), and can be viewed as the addition of a "color" to the signal, that allows identifying the transmission source. Particularly, in downlink (i.e., from the radio base station to the mobile terminal), the scrambling process allows distinguishing the signals within a given network cell from the signal within a different cell: to this purpose, different scrambling codes are used in different cells, in particular if such cells are neighboring.

The adoption of the CDMA access scheme has an impact on the "handover" procedures, by which, generally speaking, there is intended the set of procedures that makes it possible to keep active a service provided to a generic mobile user even when the user moves. In particular, in the CDMA access scheme a mobile user may exploit a same radio channel in different cells; thus, the passage of responsibility (handover) of a given mobile user from one network cell to another adjacent thereto (typically, in consequence of the movement of the mobile user through the geographic area) can be handled by keeping the communication with the user active on the same channel. In particular, thanks to the fact that the signals irradiated by different sources (different antennas corresponding to different cells) are distinguishable because of the use of different scrambling codes, a mechanism referred to as "soft-handover" (relying on a particular type of receiver in the User Equipment—UE—, called "Rake") allows the mobile user's terminal to decode signals coming from, and thus to exchange information with, two or more different antennas or, more generally, with different radio base stations. In particular, thanks to the soft-handover mechanism, the UE can distinguish between signals issued by different radio base stations, i.e. by different cells, by looking at the different signal color. These areas with coverage from two or more cells are referred to as "soft-handover areas" or "macrodiversity areas". More generally, the term "macrodiversity" is used to identify the process allowing the UE connection through more than one Base Station/Access Point at the same time for the same connection in progress. The different network cells to which the UE is simultaneously connected form the so-called "Active Set" (AS).

As known, in the UMTS the set of scrambling codes used in downlink is represented by the Gold codes featuring low self-correlation and cross-correlation. The length of the Gold code for the UMTS system is in principle equal to eighteen bits, for a total of $2^{18}-1=262,143$ different codes. However, in order to keep the receiver not too complex, only a fraction of such a vast set of codes is effectively exploited in practical implementations. Specifically, the standard currently prescribes that the number of usable codes in UMTS networks is limited to a pool of 8,192 different codes. The pool of 8,192 usable scrambling codes is subdivided into 512 groups, each group including 16 codes, where one of the sixteen codes takes the role of a so-called "Primary Scrambling Code" (PSC), and the remaining 15 codes of the group are "secondary scrambling codes".

When planning an UMTS network, or a particular regional area thereof, a unique PSC (and, consequently, the associated 15 secondary scrambling codes associated to that PSC) has to be assigned to each cell of the area under planning, the PSC being chosen among the available 512 PSCs.

The pool of 8,192 scrambling codes available for use is further considered as subdivided into 64 code groups of 128 codes each, where, within the generic code group, eight codes among the 128 codes are primary scrambling codes; thus, the pool of 8,192 available scrambling codes includes 64 code groups, each one including eight primary scrambling codes (and associated secondary scrambling codes).

In downlink, the primary scrambling code plays a role in the procedure called "cell search", which includes the set of operations that allow the UE synchronize to the network and decode the control channels of the network cell wherein it is located. Specifically, the UE invokes the cell search procedure in either one of two cases:

whenever the UE is turned on and has to register to the network for the first time (after a previous de-registration in consequence to a turn off); or for purposes of measuring the common channels of the adjacent cells, with the aim of updating the AS of different network cells to which the mobile terminal is connected (a procedure called "cell reselection").

The cell search procedure has an impact on the UE performance: depending on the complexity of the operations to be performed, the UE battery charge consumption, as well as the time required by the UE for synchronizing and decoding the control channel (the so-called "Broadcast Control Channel"—BCH) over which the network information travels, vary. In particular, the cell search procedure impact on the battery charge consumption is higher when the procedure is performed in support of the cell reselection procedure, because such operation is carried out more frequently compared to the initial synchronization of the UE upon turning it on.

The assignment of scrambling codes in downlink can be effected by means of planning algorithms. In particular, the scrambling code assignment should satisfy a PSC re-use requirement, according to which unique PSCs, within the set of 512 available PSCs, have to be univocally assigned to neighboring cells belonging to the geographic area being planned: this is essential for a correct implementation of the soft-handover, because the generic UE located in a macrodiversity area should be capable of discriminating between signals irradiated by different antennas (i.e., signals by different cells in the so-called "monitored set" of the UE).

In the paper by Y. H. Jung and Y. H. Lee, "Scrambling code planning for 3GPP W-CDMA systems", IEEE VTC2001 Spring, Rhodes, Greece, May 2001, an M×M matrix $C=[c_{ij}]$ (where M is the number of network cells) is defined, called "compatibility matrix", wherein the generic matrix element $c_{ij}$ is a constant equal to either one or zero, depending on whether or not the distance between the i-th and j-th cells is or not less than a so-called "reuse distance", which is the minimum distance between cells that can have an identical code set. Moreover, a set S of available code indexes $S=\{1, 2, \ldots, z\}$ is introduced. The scrambling codes are then assigned in the respect of two constraints: first, only one scrambling code set is assigned to a cell; second, the code index separation between the i-th and j-th cells should be greater than or equal to $c_{ij}$.

SUMMARY OF THE INVENTION

The Applicant has observed that the approach outlined by Jung and Lee is adapted to assign the PSCs respecting the requirement of equation (1) above if and only if the number of elements cij different from 0, i being fixed and j variable, is at most equal to the maximum number of available PSCs (512).

Also, the Applicant has observed that a limitation of the approach by Jung is that no indications are provided for the correct definition of the set of cells which are "adjacent" to the generic cell under consideration. An incorrect definition of such set of cells may lead to a PSC plan that is not adequate.

In view of the outlined state of the art and related problems, drawbacks and limitations, the Applicant has tackled the general problem of PSC assignment to the different cells of a network area under planning.

In particular, the Applicant has tackled the problem of how to properly define neighborhood and adjacency relationships between cells in a network area under planning, to be used in the PSC assignment, which neighborhood and adjacency relationships are adapted to ensure that the cells of the area under planning that may operate in macrodiversity are assigned unique PSCs. The Applicant has found a way to correctly define the set of adjacent cells in order to make an adequate PSC plan, by providing for each cell a set of adjacent cells including: 1) cells that are neighbors up to the third order, wherein two cells are considered neighbors in case the respective coverage areas at least partially overlap; 2) cells suitable to produce, in points of the considered geographic area where the considered cell produces a signal power higher than a predetermined threshold, respective signal powers higher than the same threshold, preferably taking into account the traffic offered by said cells in said points.

In particular, two cells are considered neighbors if their areas of coverage have at least one pixel in common, or if the signal of one cell is perceived on average in the area of the other cell to an extent exceeding a predetermined statistical threshold.

According to a first aspect thereof, the present invention thus relates to a method for assigning scrambling codes in a CDMA cellular radio communications network comprising a plurality of network cells covering a geographic area. The method includes determining, for each given cell of said plurality of cells, a respective set of adjacent cells, and assigning to each cell of the set a scrambling code different from a scrambling code assigned to the given cell, wherein determining the set of adjacent cells for a given cell includes combining the following sets of cells:

a first set of cells that are neighbors of the given cell;

a second set of cells that are neighbors of neighbors of the given cell;

a third set of cells that are neighbors of neighbors of neighbors of the given cell, and a fourth set of cells which, in at least one point of the geographic area, together with the given cell, produce respective signal powers higher than a predetermined threshold.

The step of taking a fourth set of cells preferably includes calculating a mutual difference in respective signal powers of the given cell and a cell of the fourth set of cells.

The method may further comprise calculating a weight factor from the calculated mutual difference.

Moreover, the method may further comprise calculating a cumulative weight factor by adding the weight factor for all the points of the geographic area in which the cell of the fourth set of cells and the given cell produce respective signal powers higher than the predetermined threshold.

Preferably, the method also comprises calculating a number of points of the geographic area in which the signal power of the given cell and of at least another cell of said plurality exceeds the predetermined threshold.

In addition, the method may comprise calculating an adjacency coefficient by normalizing said cumulated weight factor by the calculated number of points.

The step of taking a fourth set of cells may also include:

setting a predetermined adjacency threshold; and taking the cells of said fourth set of cells for which the respective adjacency coefficient exceeds that adjacency threshold.

The step of calculating the weight factor preferably includes taking into account an indication of traffic offered to said point of the geographic area.

Moreover, the step of calculating the number of points of the geographic area preferably includes taking into account an indication of traffic offered to said point of the geographic area.

According to a second aspect thereof, the present invention relates to a data processing system for assigning scrambling codes in a CDMA cellular radio communications network comprising a plurality of network cells covering a geographic area, including means adapted to determine, for each given cell of said plurality of network cells, a respective set of adjacent cells, said set of adjacent cells including:

a first set of cells that are neighbors of the given cell;
a second set of cells that are neighbors of neighbors of the given cell;
a third set of cells that are neighbors of neighbors of neighbors of the given cell,
wherein two cells are considered neighbors in case the respective coverage areas at least partially overlap; and
a fourth set of cells which, in at least one point of the geographic area, together with the given cell, produce respective signal powers higher than a predetermined threshold;

each cell of the set of adjacent cells having assigned a scrambling code different from a scrambling code assigned to the given cell.

Other aspects of the invention relate to a computer program implementing the method when executed by a data processing system, and a computer program product including such a computer program.

BRIEF DESCRIPTION OF THE DRAWINGS

The features and advantages of the present invention will be made apparent by the following detailed description of an embodiment thereof, provided merely by way of non-limitative example, description that will be conducted making reference to the annexed drawings, wherein:

FIG. 2 schematically represents a spreading and scrambling operations performed on a signal to be transmitted, according to the UMTS standard;

FIG. 3 schematically shows, in terms of a timing diagram, the result of the operations of spreading and scrambling on a signal to be transmitted;

FIG. 4 pictorially shows a subdivision in groups of the scrambling codes, according to the UMTS standard;

FIG. 5 pictorially shows a best server area of a network cell, and a pixel thereof whereat several cells are in macrodiversity;

FIGS. 6A to 6D schematically depict different cases of cells adjacency which need to be taken into account for a correct PSC assignment;

DETAILED DESCRIPTION OF THE PREFERRED EMBODIMENT(S) OF THE INVENTION

Figure 1:
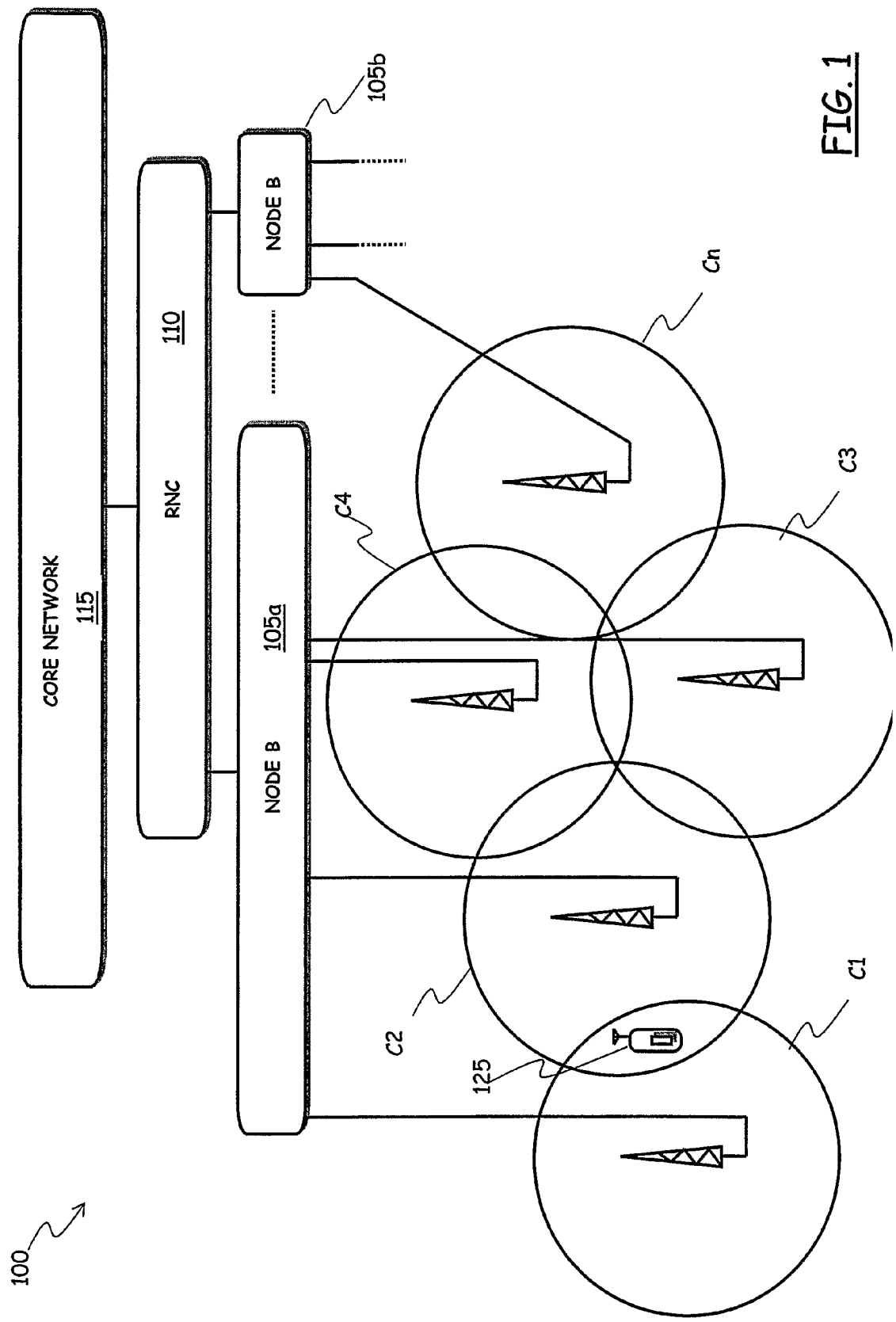
FIG. 1 pictorially shows a portion of a UMTS network being planned, intended to cover a respective geographic area, with a plurality of network cells to which scrambling codes are to be assigned during the planning process.

Referring to the drawings, in FIG. 1 there is schematically depicted a portion of UMTS network under planning, particularly an UMTS network portion intended to provide cellular mobile communications capability within a given geographic area.

The UMTS network portion under consideration, identified globally by reference numeral 100, comprises a plurality of cells C1, C2, C3, C4, . . . , Cn, each one having a relatively limited area coverage (the area coverage of the generic cell depending on several factors such as, for example, the environment wherein the UMTS network is installed, as will be described in greater detail later on). The cells are each one made up of a plurality of pixels, i.e., they are the set of geographic points covered and served by the radio electromagnetic signal irradiated by a respective cell's antenna.

Usually, groups of three to six cells (on average) are managed by a network entity called "Node B", such as the Node Bs 105a and 105b in the drawing (where, merely by way of example, it is assumed that the cells C1, C2, C3, and C4, are managed by the Node B 105a, and that the cell Cn is managed by the Node B 105b).

Groups of Node Bs are managed by a Radio Network Controller (RNC), like the RNC 110 shown in the drawing; the RNCs are connected to the core UMTS network 115.

A generic UE, like the UE 125 depicted as located within the cell C1, can receive signals transmitted by the transmitters, and irradiated by the antennas, of different cells, e.g. the cells C1 and C2, and is able to differentiate among them.

This differentiation of signals coming from different transmitters is made possible by the adoption of the CDMA access technique. Making reference to FIGS. 2 and 3, each transmitter (particularly, the transmitter of the generic network cell) implements a spreading and a subsequent scrambling of the signal to be transmitted. The signal (data) to be transmitted 205, having a given symbol rate (usually called the bit rate) is first submitted to a spreading process 210, using a spreading code 215, in order to "widen" its spectrum and distribute (and thus lower) its power over the whole channel bandwidth. The spreading code 215 has a higher number of symbols than the signal to be transmitted 205, thus the spread signal 220 has a symbol rate (a chip rate, in jargon) higher than the bit rate of the initial signal 205.

The spread signal 220 is then submitted to a scrambling process 225, using a scrambling code or scrambling sequence 230. The signal scrambling process does not change the chip rate, thus the signal 235 to be transmitted "over-the-air" has a chip rate equal to that of the spread signal.

The scrambling process is used for making signals transmitted by the transmitters of different cells distinguishable.

To this purpose, every cell has to use a unique scrambling code, and thus a problem of scrambling code assignment rises.

As mentioned in the foregoing, in the UMTS standard the set of scrambling codes used in downlink is represented by the Gold codes featuring low self-correlation and cross-correlation. The length of the Gold code for the UMTS system is equal to eighteen bits, thus, in principle, a total of $2^{18}-1=262,143$ different codes would be available. However, in order to keep the receiver (particularly, the one on-board the UEs) not too complex, only a fraction of such a vast set of codes is effectively exploited. Specifically, the standard prescribes that the number of usable codes in UMTS networks is 8,192.

Making reference to FIG. 4, the pool of 8,192 usable scrambling codes (identified globally by 400 in the drawing) is subdivided into 64 groups, like the group GR1 in the drawing, wherein each of said scrambling codes group, as depicted in the drawing, contains 128 different scrambling codes.

Within the 8,192 different scrambling codes, 512 of them are selected and adopted as "Primary Scrambling Codes" (PSCs) PSC, whereas the remaining scrambling codes are "Secondary Scrambling Codes" (SSCs) SSC. This simplifies the procedures of the search of the scrambling code and cell identification by the UE: in fact, some of the channels (for example, the Common Control Physical CHannel—CCPCH—and the Common PIlot CHannel—CPICH) always use the PSC, whereas other physical channels in downlink may either use the PSC or an SSC.

By defining the 512 PSCs, the pool of 8,192 different scrambling codes can be viewed as subdivided into 512 sets of 16 scrambling codes each, where one of the sixteen scrambling codes is a PSC, the remaining 15 being SSC.

Therefore, referring again to FIG. 4, each group of 128 scrambling codes, like the group GR1, includes eight sets of 16 scrambling codes, and thus eight PSCs (those depicted as shaded squares), with the associated SSCs.

The geographic area represented schematically in FIG. 1 is assumed to be an area of the UMTS network to be planned. Planning the network area means, among other issues, properly assigning PSCs to the different cells of the area under planning.

In the following description, a method for assigning the PSCs to the different network cells of the area under planning will be described.

Firstly, a list of parameters is provided herein below, with corresponding definitions, that will be referred to in the description of the PSC assigning method; at least some of the parameters defined are better understood making reference to FIG. 5.

Symbol Definition j Index specifying the generic cell Cj of the area under planning;

(m,n) generic pixel of coordinates m, n in the network area under planning;

$RSCP_{(m,n)}^j$ power level of the channel CPICH (Common Pilot CHannel) of the generic cell Cj at the generic pixel (m,n)

$\Omega_j$ set of pixels (m,n) belonging to the area being planned whereat the CPICH power level $RSCP_{(m,n)}^j$ of the cell Cj is higher than the power level $RSCP_{(m,n)}^k$ at that pixel of any other cell Ck in the area being planned (in other words, $\Omega_j$ identifies the best server area of the cell Cj as far as the CPICH is considered);

$Ta_{(m,n)}^j$ generic UE present at the pixel (m,n) belonging to the best server area $\Omega j$ of the cell Cj and connected to the cell Cj;

$NBR^j$ "NeighBoRhood set" (or NBR set) for the cell Cj, i.e. the list of cells which are adjacent to the cell Cj (i.e., cells which have at least one pixel in common with the cell Cj); the adjacency criterion may be a simple geometrical one, i.e., two cells are considered adjacent in case their area of coverage have at least one pixel in common, or take into account electromagnetic field propagation aspects, thereby two cells may be considered adjacent if the signal of one cell is perceived on average in the area of the other cell to an extent exceeding a predetermined statistical threshold; in the following of this description, the term "geometrically adjacent" will be used to denote cells that are considered adjacent based on the criterion adopted in the planning phase for constructing the sets NBR sets;

$\Delta_{SH}$ maximum admissible difference in the CPICH power level $RSCP_{(m,n)}^j$ and $RSCP_{(m,n)}^k$ of two generic cells Cj and Ck for the cell Ck to enter in macrodiversity with the cell Cj in the pixel (m,n) belonging to the best server area $\Omega j$ of the cell Cj;

$CS_{(m,n)}^j$ Candidate Set (CS), including all the cells Ck for which $RSCP_{(m,n)}^j - RSCP_{(m,n)}^k \leq \Delta_{SH}$, $(m,n) \in \Omega_j$; for example, referring to FIG. 5, the $CS_{(m,n)}^j$ includes, in addition to the cell Cj (i.e., the best server in the area including the pixel (m,n) considered), the cells Cq, . . . , Cr, Cs, whereas the remaining cells, like Ct, whose CPICH has, at the pixel (m,n), a power level less than $RSCP_{(m,n)}^j - \Delta_{SH}$, are not included in the CS;

$AS_{(m,n)}^j$ Active Set (AS), including all the cells, belonging to the area under planning, to which the UE $Ta_{(m,n)}^j$, located at the pixel (m,n), is connected in macrodiversity;

$MS_{(m,n)}^j$ Set (MS), i.e. the list of cells built by the generic UE by combining the NBR sets in respect of the cells included in the AS $AS_{(m,n)}^j$, exploiting algorithms that depends on the UE manufacturer;

$PSC^j$ PSC assigned to the cell Cj;

ADJ[j] list of cells which are adjoined to the generic cell Cj (according to the criteria described in the following) and which have to be assigned mutually different PSCs; in other words, each cell belonging to ADJ[j] must have a PSC different from that of cell Cj.

It is observed that some of the above listed parameters, like the parameter $NBR^j$, are defined on the basis of merely geometrical considerations during the planning of the network area; other parameters, like the parameters $RSCP_{(m,n)}^j$, $\Omega_j$, are defined on the basis of measures or simulations of the distribution of the electromagnetic field on the territory.

For the proper operation of the network, the PSC to be assigned to the generic cell of the network area under planning should be such that (equation (1)):

$$PSC^z \neq PSC^k \begin{cases} \forall z \quad \forall k \quad \in MS_{(m,n)}^j \\ \forall (m,n) \quad \in \Omega_j \end{cases}$$

In other words, the PSC to be assigned to the generic cell of the area under planning should differ from the PSC assigned to any other cell in the monitored set $MS_{(m,n)}^j$, and this should be true in any pixel (m,n) in the best server area $\Omega j$ of each cell Cj.

If the above condition is satisfied, it is ensured that the generic UE is able to discriminate among signals coming from different cells in any macrodiversity areas.

Unfortunately, the monitored set $MS_{(m,n)}^j$ for the generic cell Cj is in general not known a priori, particularly it is not known at the time the network area is being planned, because it is built based on more or less proprietary algorithm running in the UEs, which algorithms differ from UE manufacturer to UE manufacturer, and also depends on the position of the UE.

The Applicant has found that the requirement expressed in equation (1) above can be satisfied if, for the generic cell Cj of the area under planning, the following criterion is satisfied (equation (2)):

$PSC^j \neq PSC^k \forall k \in ADJ[j]$, where the list or set ADJ[j] of "adjoined cells", i.e. of cells that are adjoined to the generic cell Cj, is properly built, in the way described hereinbelow.

In particular, the Applicant has found that the set ADJ[j] of adjoined cells for the generic cell Cj should in principle include:

a) all the cells that are geometrically adjacent to the cell Cj; in symbols:

$$\{Ck\} \forall k \in NBR^j$$

a) all the cells that are geometrically adjacent to any cell being in turn geometrically adjacent to the cell Cj; in symbols:

$$\{Ck\}, \forall k \in NBR^k, \forall i \in NBR^j,$$

c) all the cells that are geometrically adjacent to any cell being geometrically adjacent to any cell that is turn adjacent to the cell Cj; in symbols:

$$l \{Ck\}, \forall k \in NBR^i, \forall i \in NBR^w, \forall w \in NBR^j, \text{ and}$$

d) all the cells that are geometrically adjacent to any cell being geometrically adjacent to any cell that is geometrically adjacent to any cell being in turn geometrically adjacent to the generic cell Cj; in symbols:

$$\{Ck\}, \forall k \in NBR^i, \forall i \in NBR^w, \forall w \in NBR^z, \forall z \in NBR^j.$$

In particular, case a) means that the set ADJ[j] of adjoined cells for the generic cell Cj includes all the cells listed in the NBR set NBR$^j$ for the cell Cj, i.e. all the cells that, based on geometrical considerations, are declared to have at least one pixel in common with the cell Cj, like the cell Ca in FIG. 6A (first-order adjacency).

Case b) means that the set ADJ[j] of adjoined cells for the generic cell Cj further includes all the cells that are listed in the NBR sets of the cells geometrically adjacent to the cell Cj; this is a second-order adjacency condition: two generic cells are defined to be adjacent cells of the second-order if they share at least one adjacent cell, i.e. if there is at least one cell that is adjacent to both the two cells under consideration; it is for example the case of the cell Cb in FIG. 6A.

Case c) means that the set ADJ[J] of adjoined cells for the generic cell Cj further includes all the cells that are listed in the NBR sets of the cells geometrically adjacent to cells that are in turn geometrically adjacent to the cell Cj; this case introduces a third-order adjacency condition. It is for example the case of the cell Cc in FIG. 6B, and of the cells Cc and Ce in FIG. 6C.

Case d) means that the set ADJ[j] of adjoined cells for the generic cell Cj further includes all the cells that are listed in the NBR sets of the cells geometrically adjacent to cells that are in turn geometrically adjacent to cells being in turn geometrically adjacent to the cell Cj; this case introduces a fourth-order adjacency condition. It is for example the case of cell Cd in FIG. 6D.

By including in the list ADJ[j] of adjoined cells the first-order adjacent cells, equation (2) above ensures that geometrically adjacent cells will be assigned different PSCs.

Furthermore, by including in the list ADJ[j] of adjoined cells the second-order adjacent cells, equation (2) above ensures that cells included in the NBR sets of cells geometrically adjacent to any cell geometrically adjacent to the generic cell Cj will be assigned different PSCs.

By including in the list ADJ[j] of adjoined cells the third-order adjacent cells, equation (2) above ensures that, taken any two geometrically adjacent cells (such as Ca and Cb in FIG. 6B), the union of their respective NBR sets does not contain cells having same PSC; also, equation (2) ensures that, taken three generic cells being geometrically adjacent two by two (such as Ca, Cb and Cd in FIG. 6C), the union of their NBR sets does not include cells having same PSC. It is observed that the inclusion, in the list ADJ[j] of adjoined cells, of the third-order adjacent cells allows overcoming the problem related to the fact that the composition of the monitored set in the areas of soft-handover is not known a priori.

Furthermore, by the inclusion in the list ADJ[j] of adjoined cells the fourth-order adjacent cells, equation (2) ensures that, considering three cells in soft-handover (such as Ca, Cb and Cc in FIG. 6D), the union of their three NBR sets does not include cells having same PSC even if two cells (such as Ca and Cc in FIG. 6D) out of the three considered cells assumed in soft-handover have not been declared geometrically adjacent (i.e., they are not included in the respective NBR sets). This allows taking into account worst-case situations wherein an active set includes cells that, erroneously, were not declared mutually geometrically adjacent.

The Applicant has observed that the cardinality DIM[ADJ [j]] of the set ADJ[j] built in the way discussed above, i.e. the number of cells included in the set ADJ[j], at least in non-trivial cases, may be so high that it is not possible to assign the PSCs without violating the requirement expressed by equation (1) above; in other words, the number of available PSCs (512, in the current implementation of the standard) may be not sufficient.

In particular, a significant increase in the dimension of the set ADJ[j] is due to the inclusion of the fourth-order adjacent cells (case d), which however is important for taking into account critical, worst-case situations in which two cells, albeit not declared mutually adjacent, are in the practice, i.e. from an electromagnetic field viewpoint, in macrodiversity. Nevertheless, in normal situations, i.e. when the geometrical adjacency of the cells is correctly declared (i.e., the NBR sets are properly defined), the inclusion in the set ADJ[j] of fourth-order adjacent cells imposes an unnecessary limitation as far as the fulfilment of the condition posed by equation (1) above is concerned. This may be especially penalizing in network scenarios wherein the overall number of cells in the area under planning is significantly higher than the maximum number of available PSCs: in such cases, the cardinality of the set ADJ[j] may easily become too high compared to the number of available PSCs.

According to an embodiment of the present invention, a method for building an optimized set ADJ[j] of adjoined cells for the generic cell Cj of the area under planning is set forth. In particular, the method according to the invention embodiment to be described allows reducing the dimension of the set ADJ[j], while however ensuring that the use of the set ADJ[j] for the unique assignment of the PSCs guarantees the observance of the condition set forth by equation (1) above, i.e. the soft-handover is correctly managed.

In particular, the method according to the invention embodiment herein discussed is adapted to build, for the generic cell Cj of the network area under planning, a list ADJ[j] of adjoined cells, including the union of the list of the first-order adjacent cells for the cell Cj, the list of second-order adjacent cells for the cell Cj, the list of the third-order adjacent cells for the cell Cj, and (instead of including the list of the fourth-order adjacent cells) further including a list of cells which are declared "interferentially adjacent" based on a criterion that takes into account the electromagnetic field distribution aspects.

In particular, in an embodiment of the present invention, the method to be described may be implemented by means of a program executed by a suitable data processing apparatus, such as a general-purpose personal computer or a workstation specifically programmed to execute a program.

Figure 7:
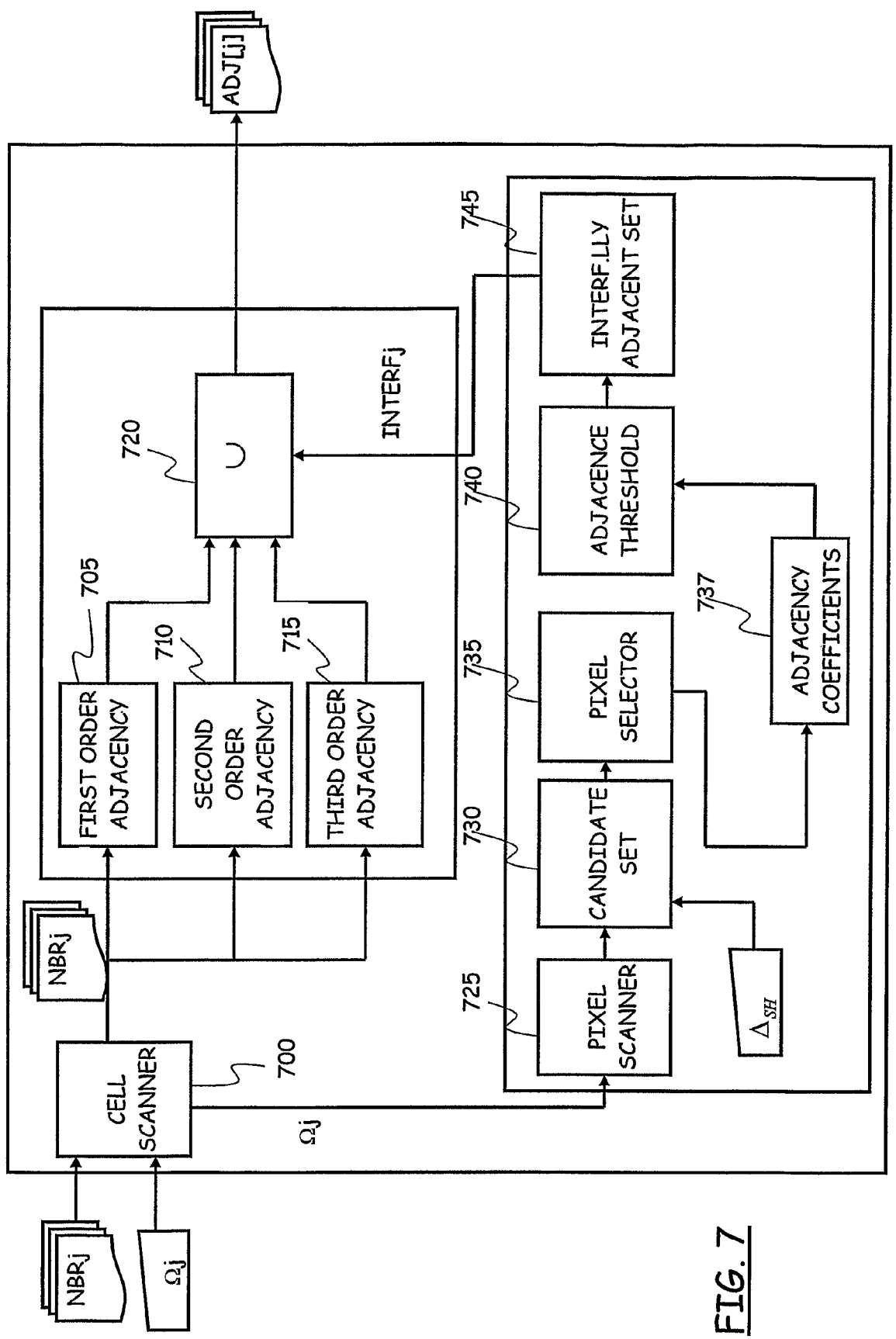
FIG. 7 schematically depicts the main functional components of an adjacency list calculator according to an embodiment of the present invention.

Referring to FIG. 7, the main functional components of the program implementing the method are schematically depicted.

A cell scanner module 700 scans the cells of the network area being planned, and receives as input, for each j-th cell Cj of a set of cells C={C1, C2, ..., Cn} belonging to the area being planned, the list NBRj of neighboring cells (i.e., of geometrically adjacent cells) and the best server areas $\Omega_j$.

It is observed that the set of cells C={C1, C2, ..., Cn} (with n denoting a positive integer) to which it is necessary to assign the respective PSCs is intended to have been already created; the number n of cells, and their nature, particularly their area coverage, is assumed to have been defined in advance, according to criteria such as the traffic load to be managed, the traffic geographical distribution, the network accessibility target (e.g., indoor, outdoor, "in car", ...), the traffic mobility (e.g., the average speed of the users), the area targets to be served, etc.

The neighboring lists NBRj are passed to a first-order, a second-order and a third-order adjacency calculator modules 705, 710 and 715, adapted to calculate the lists of first-order, second-order and third-order adjacent cells to the generic cell Cj considered.

A cells lists union calculator module 720 receives the lists calculated by the first-order, the second-order and the third-order adjacency calculator modules 705, 710 and 715, and calculates the union thereof (eliminating repetitions of same cells).

The cell scanner module 700 also passes the best server area $\Omega_j$ received in input in respect of the generic cell Cj to a pixel scanner module 725, adapted to scan the different pixels (m,n) of the best server area $\Omega_j$. It is observed that the best server area $\Omega_j$ includes, for each pixel (m,n), a list of cells whose irradiated signal is perceived at the pixel (m,n), the cells in said list being ranked according for example to the power level of their CPICH at that pixel (m,n).

A candidate set builder module 730 determines, for the generic pixel (m,n) of the best server area $\Omega_j$ of the cell Cj, the respective candidate set $CS_{(m,n)}^j$, exploiting the maximum admissible difference $\Delta_{SH}$ in the CPICH power level for determining which cells are to be included in the candidate set, and which not (in particular, by including only those cells having in the generic pixel (m,n) a CPICH power level that differs from the CPICH power level of the cell Cj of less than $\Delta_{SH}$).

A pixel selector module 735 receives the candidate set $CS_{(m,n)}^j$ and is adapted to select those pixels of the best server area $\Omega_j$ of the cell Cj for which the candidate set includes at least one further cell in addition to the best server cell Cj.

An adjacency coefficients calculator module 737 calculates a plurality of adjacency coefficients, one for each pair of cells in the area under planning, which, as will be described in the following, are indicative of a degree of electromagnetic adjacency of two generic cells.

An adjacency threshold calculator module 740 is adapted to calculate, for the cell Cj under consideration, an adjacency threshold which is used for discriminating whether another cell belonging to the candidate sets $CS_{(m,n)}^j$ of the pixels of the best server area $\Omega_j$ of the cell Cj is to be included in the list ADJ[j] of adjoined cells for the cell Cj. An interference set calculator module 745 receives the adjacency threshold and determines the list of cells to be included in the adjoined set ADJ[j] for the cell Cj. The calculated list is passed to the lists union calculator module 720, which provides in output the list ADJ[j] of the cells adjoined to the cell Cj.

Figure 8:
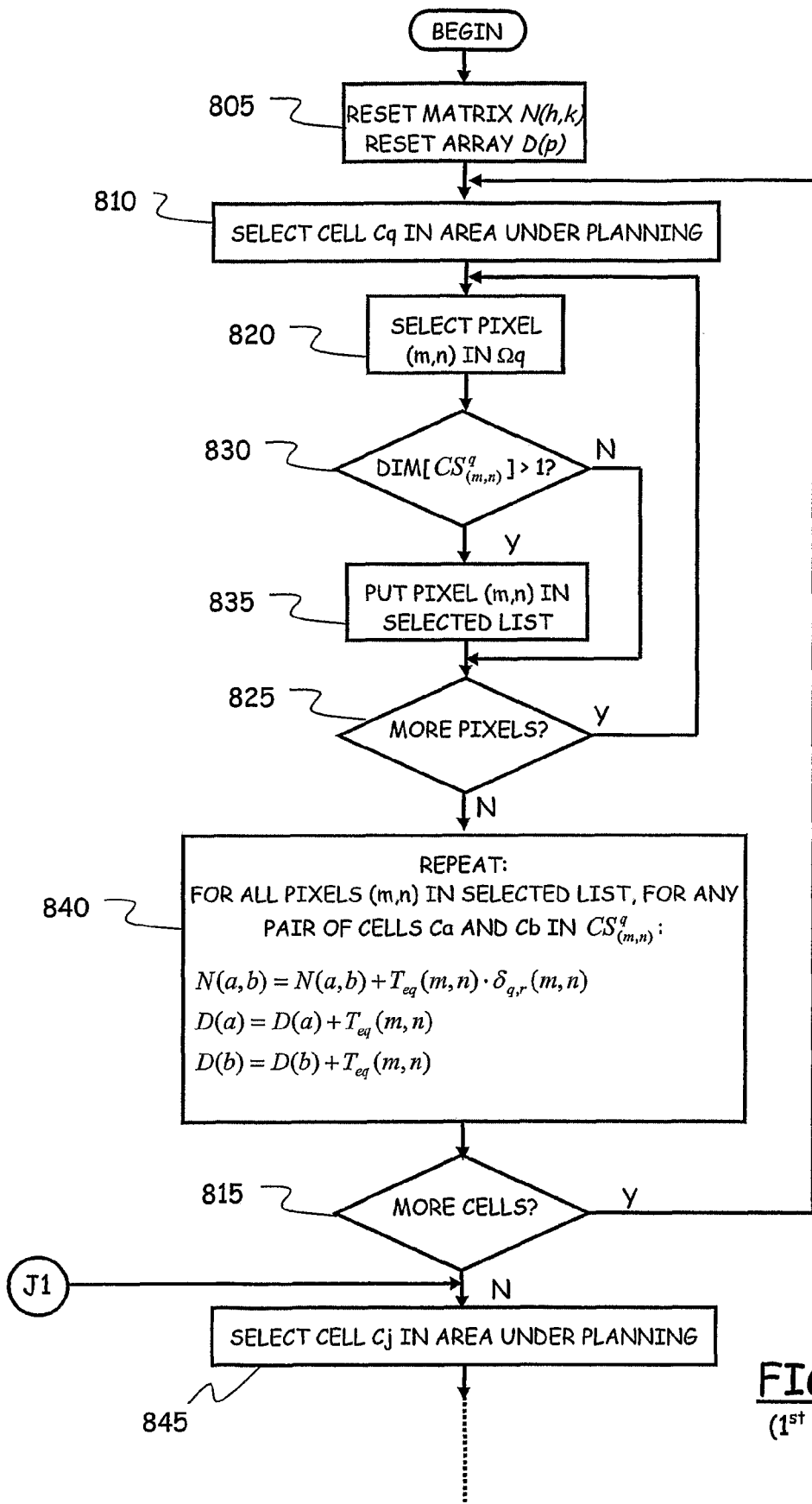
FIG. 8 is a schematic flowchart showing the main actions performed by the adjacency list calculator, in an embodiment of the present invention.
Figure 8:
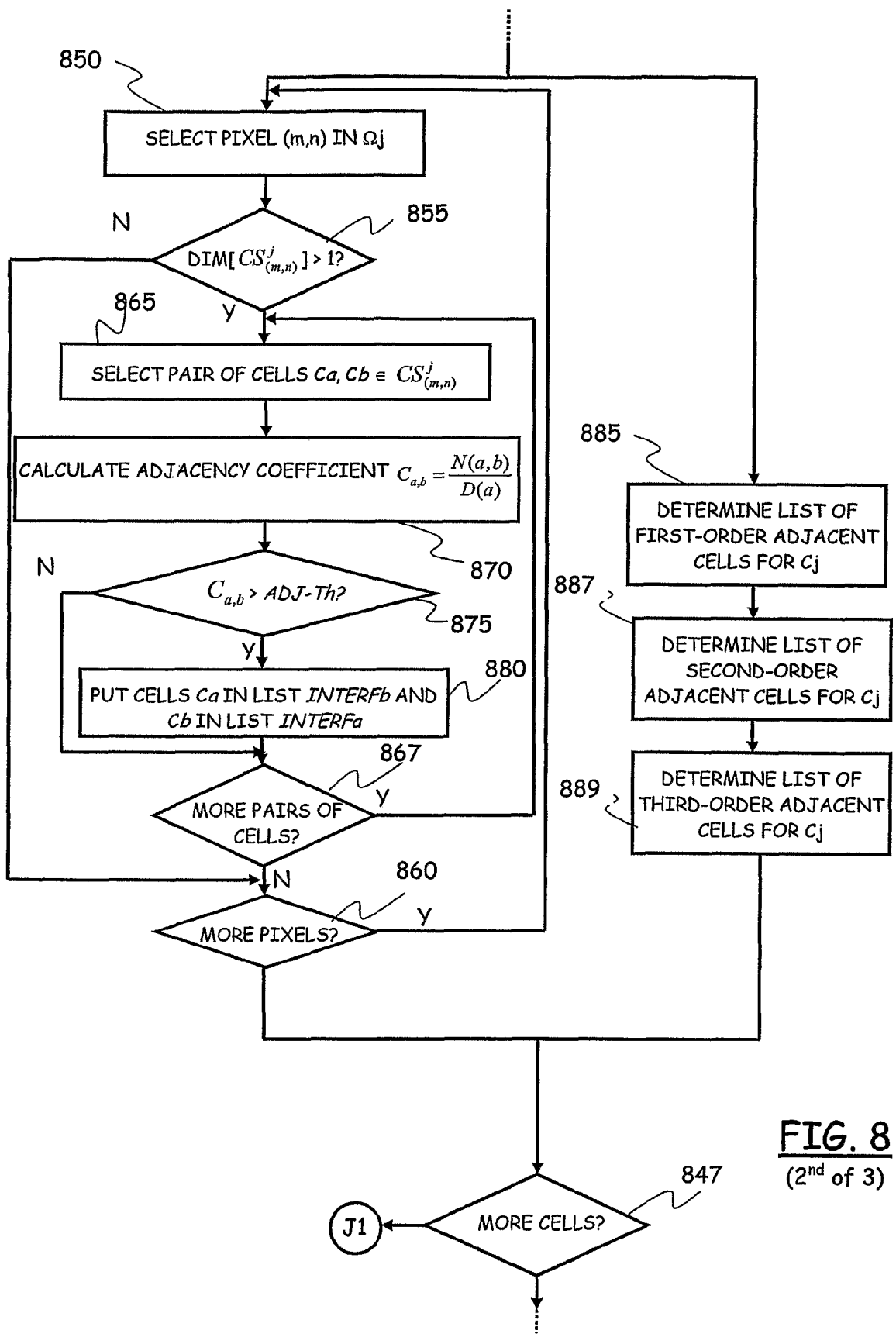
Figure 8:
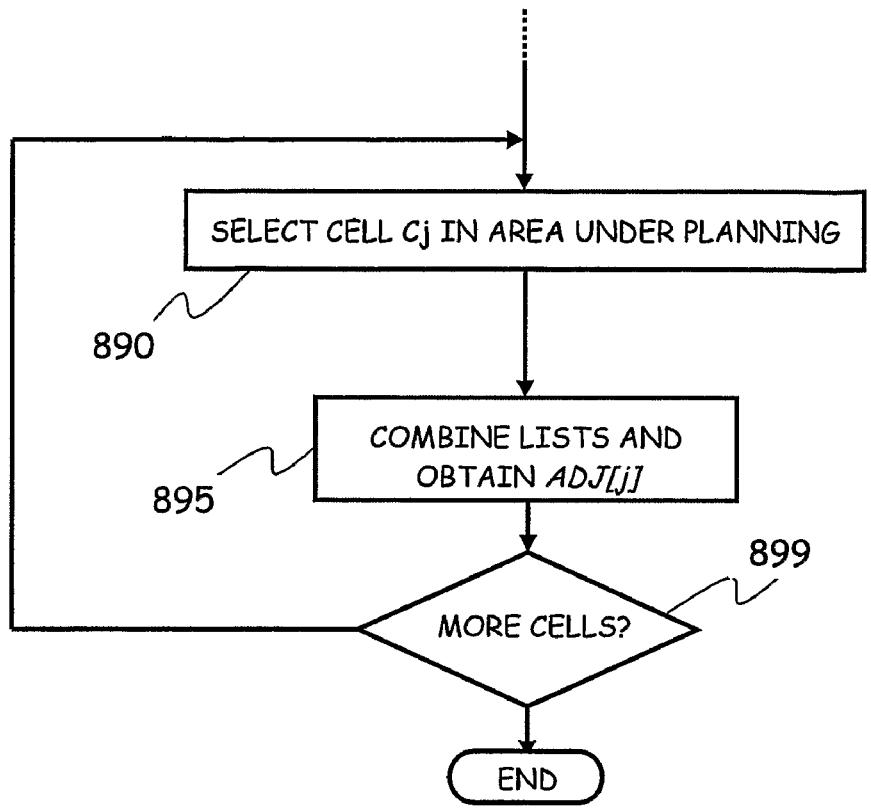

An exemplary procedure for determining the lists ADJ[j] of adjoined cells to the cells of the area under planning will be now described with the help of the schematic flowchart of FIG. 8.

In particular, the procedure leads to the construction of a square matrix N(s,t), having a number of rows equal to the number n of cells in the area being planned, and of a vector D(u), with a number of elements equal to the number n of cells in the area under planning. The meaning of the elements of the matrix N(s,t) and of the components of the vector D(u) will be explained later on.

Firstly, the values of the elements of the matrix N(s,t) and of the components of the vector D(u) are reset to zero (block 805).

An iterative procedure is then performed over all the cells of the area under planning, selecting one cell Cq at a time (block 810, and decision block 815).

For the generic selected cell Cq, another iterative procedure is performed, scanning all the pixels (m,n) of the respective best server area $\Omega_q$ (block 820, and decision block 825).

For the generic pixel (m,n) under processing, it is ascertained whether that pixel belongs to a region of macrodiversity of the best server area $\Omega_q$; to this purpose, it is ascertained whether the candidate set $CS_{(m,n)}^q$ at that pixel includes more than one cell (i.e., at least one further cell in addition to the best server cell Cq) (block 830, exit branch Y). In the affirmative case, the pixel is put in a list of selected pixels (block 835).

After having created the list of selected pixels, the elements of the matrix N(s,t) and the components of the vector D(u) are calculated by performing, for each pixel in the list, and for each cell Cq belonging to the area under planning, the following calculations:

$$N(a,b) = N(a,b) + T_{eq}(m,n) \cdot \delta_{a,b}(m,n)$$

$$D(a) = D(a) + T_{eq}(m,n)$$

$$D(b) = D(b) + T_{eq}(m,n)$$

for all the cells Ca and Cb belonging to $CS_{(m,n)}^q$ and by making N(a,b)=N(b,a).

In the above formulas, $T_{eq}(m,n)$ denotes an "equivalent" traffic offered to the pixel (m,n), calculated as:

$$T_{eq}(m,n) = \sum_s T_s(m,n) \frac{R_S}{R_0}$$

wherein $T_s(m,n)$ is the traffic offered to the pixel (m,n) by the generic service s, $R_s$ is the maximum bit rate associated with the service s, and $R_0$ is a reference service. Thus, the equivalent traffic $T_{eq}(m,n)$ is the sum of the traffic offered to the pixel (m,n) by all the services, weighted by the respective bit rates.

$\delta_{a,b}(m,n)$ identifies instead a weight, ranging from 0 to 1, which is calculated as:

$$\delta_{a,b}(m,n) = 10^{-|(RSCP_{(m,n)}^b - RSCP_{(m,n)}^a)|/10}$$

i.e., $\delta_{a,b}(m,n)$ is closer to 0 the higher the difference between the CPICH power level (at the pixel (m,n) of the best server area $\Omega_q$) of the cell Cb compared to the CPICH power level of the cell Ca (at the same pixel (m,n) of the best server area $\Omega_q$).

In other words, the value of the generic $q^{th}$ component D(q) of the vector D(u) provides a measure of the area wherein the generic cell Cq is potentially in macrodiversity with at least one other cell (i.e., the area of the candidate set of the cell Cq, excluded those pixels wherein the cell Cq is alone in the candidate set), weighted by a weight factor corresponding to the sum of all the (equivalent) offered traffic.

The value of the generic element N(a,b) of the matrix provides a measure of the portion of the candidate set area of the cell Ca, wherein both the cell Ca and the cell Cb are both in the candidate set, weighted by a weight factor which provides a measure of the (equivalent) offered traffic.

In this way, the matrix N(s,t) and the vector D(u) are built.

Then, for each cell Cj in the area under planning (block 845, decision block 847, and connector J1), the associated list ADJ[j] of adjoined cells is calculated in the following way.

Selected the generic cell Cj in the area under planning (block 845), all the pixels (m,n) in the respective best server area Ωj for which $DIM[CS_{(m,n)}{}^j]>1$ are scanned (block 850, and decision blocks 855 and 860). Any possible pair of cells Ca and Cb belonging to the candidate set for the selected pixel (m,n) in the best server area Ωj is then taken (block 865, and decision block 867), and for each pair of cells Ca and Cb an adjacency coefficient $C_{a,b}$ indicative of a degree of adjacency of the two cells Ca and Cb is calculated as follows (block 870):

$$C_{a,b} = \frac{N(a,b)}{D(a)}$$

i.e., by calculating a ratio between the value of the matrix element N(a,b), and the value of the vector component D(a). The adjacency coefficient $C_{a,b}$ can equivalently be expressed as:

$$C_{a,b} = \frac{\sum_{(m,n) \in \Psi(a,b)} T_{eq}(m,n) \cdot \delta_{a,b}(m,n)}{\sum_{(m,n) \in \Delta_a} T_{eq}(m,n)}$$

wherein $T_{eq}(m,n)$ and $\delta_{a,b}(m,n)$ have already been defined, $\Psi(a,b)$ identifies the set of pixels (m,n) wherein the cells Ca and Cb both belong to the candidate set $CS_{(m,n)}{}^j$ of the pixel (m.n) of the best-server area of the cell Cj belonging to the area under planning, whereas $\Delta_a$ is the set of pixels (m,n) wherein the cell Ca belongs to the candidate set $CS_{(m,n)}{}^j$ and for which $DIM[CS_{(m,n)}{}^j]>1$.

The adjacency coefficient takes values in the range from 0 to 1, because the parameter $\delta_{a,b}(m,n)$ is in the range from 0 to 1.

If, and only if, the adjacency coefficient $C_{a,b}$ exceeds a predetermined adjacency coefficient threshold ADJ-Th, having value in the range from 0 to 1 (decision block 875, exit branch Y), the cell $C_a$ is put in a list $INTERF_b$ and the cell $C_b$ in a list $INTERF_a$ (870).

In parallel (or in sequence) to the operations corresponding to blocks 855 to 875, first-order, second-order and third-order adjacent cell lists are calculated in respect of the cell Cj by means of modules 705, 710 and 715 of FIG. 7 (blocks 885, 887 and 889).

After the lists INTERFj and the first-order, second-order and third-order adjacent cell lists for all the cells have been calculated, a further loop is entered (blocks 890 and 899), in which, for each cell Cj, the lists of the first-order, second-order and third-order adjacent cells, and the list INTERFj calculated as discussed above, are combined, thereby obtaining the adjoined set ADJ[j] in respect of the cell Cj (block 895). In particular, the combination that allows obtaining the adjoined set ADJ[j] is the following:

the adjoined set ADJ[] is firstly initialized to the void set;
all the cells defined as adjacent (according to the adjacency criterion adopted for building the NBR sets, as discussed above) to the cell Cj (i.e., the cells Ck, ∀k∈NBRj), listed in the first-order adjacent cells list, are added to the set ADJ[j];

all the cells included in the second-order adjacent cells list (i.e., the cells Ck, ∀k∈NBRi, ∀i∈NBRj) are then added to the set ADJ[j];
all the cells included in the third-order adjacent cells list (i.e., the cells Ck, ∀k ∈NBRi, ∀i∈NBRw, ∀w∈NBRj) are then added to the set ADJ[j];
finally, all the cells Ck ∀k∈NBRi, ∀i∈INTERFw, ∀w∈NBRj are added to the set ADJ[j].

Once the sets ADJ[j] for all the different cells Cj in the area under planning have been built, such sets ADJ[j] are exploited for assigning the scrambling codes to the different network cells of the area under planning.

Figure 9:
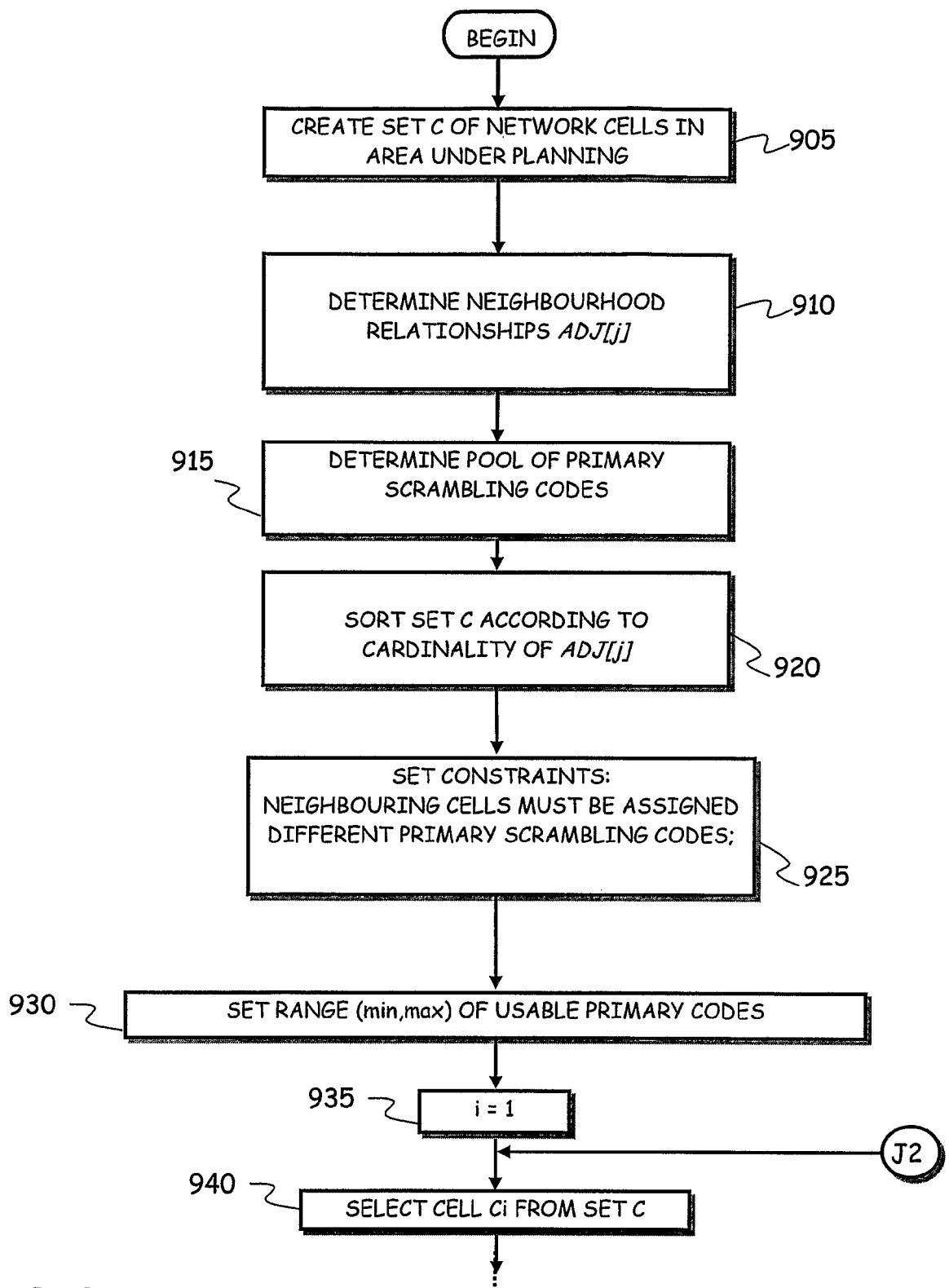
FIG. 9 is a schematic flowchart showing the main steps of an exemplary scrambling codes assignment method, for assigning scrambling codes to the cells of the network area being planned, based on the adjacency list calculated by the adjacency list calculator.
Figure 9:
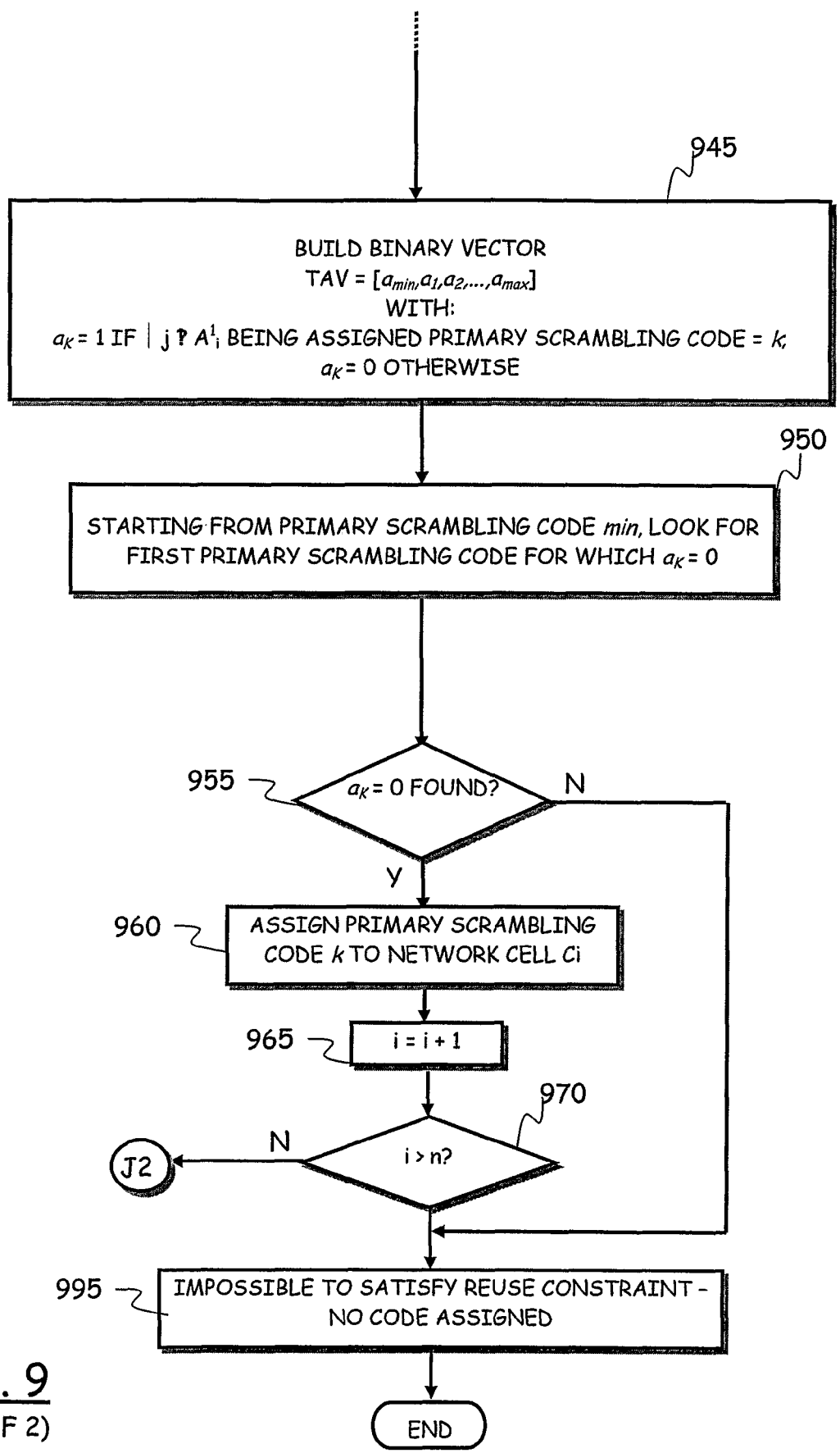

In the following, an exemplary and non-limitative method according to an embodiment of the present invention is described, adapted to be used in the UMTS network planning process, for assigning the scrambling codes to the different network cells of the area under planning. Reference will be made to the schematic flowchart of FIG. 9.

Firstly, the set $C=\{C1, C2, \ldots, Cn\}$, with n denoting a positive integer is created, where C indicates the set of the n cells C1, C2, ..., Cn belonging to the network area being planned, and to which it is necessary to assign the respective PSCs (block 905). As mentioned in the foregoing, the number n of cells, and their nature, particularly their area coverage, is assumed to have been defined in advance, according to criteria such as the traffic load to be managed, the traffic geographical distribution, the network accessibility target (e.g., indoor, outdoor, "in car", ... ), the traffic mobility (e.g., the average speed of the users), the area targets to be served, etc.

For the generic cell Ck of the set C, the set ADJ[k] of adjoined cells is calculated, according to the method described in the foregoing (block 910).

Thus, the set C of cells can be conveniently represented as:

$C=\{C1(ADJ[1]), C2(ADJ[2]), \ldots, Cn(ADJ[n])\}$.

Moreover (block 915), the pool P of m PSCs available for use in the area under planning is defined:

$P=\{PSC1, PSC2, \ldots, PSCm\}$, subdivided in groups as depicted in FIG. 4, where the pool P may include all the available 512 PSCs within the total of 8,192 scrambling code, or only a subset thereof.

The set C of cells in the area under planning is then sorted based on the cardinality of the adjoined sets ADJ[1], ADJ[2], ..., ADJ[n] (block 920). This means that, in the subsequent steps of the method, the cells having a higher number of neighbors are processed first.

Then, constrains to be respected in the PSC assignment procedure are set (block 925). In particular, the constraints may be such as to prevent the assignment of same PSCs to neighboring cells (this constraint corresponds to the main, primary scrambling code re-use constraint).

A range [min, max] of usable PSCs is then defined (block 930), within the pool of PSCs (possibly, all the 512 scrambling codes).

A repetitive procedure is then performed: a loop counter i is initialized to "1" (block 935), and the first cell in the (sorted) set C is selected for being processed (block 940).

The PSC assignment procedure will try to fulfill the PSC re-use constraint, avoiding to assign a same primary scrambling code to neighboring cells.

For the selected cell Ci a binary vector $TAVi=[a_{min}, a_1, a_2, \ldots, a_{max}]$, with $a_k=0$ or $1$ is built, depending on the PSC assignment requirements. The binary vector TAVi is built in such a way that (block 945):

$a_k=1$ if there exist a neighboring cell of the selected cell Ci (i.e., a cell belonging to the set $A^1i$) to which a PSC belonging to the group GRk of primary scrambling codes including the PSC $PSC_k$ has been assigned; whereas $a_k=0$ otherwise.

After having built the proper binary vector TAVi, the vector is scanned, starting from the vector component $a_{min}$ that corresponds to the lower PSC in the usable range [min,max], in search of the first encountered binary vector component $a_k$ that is equal to "0" (block 950).

When such a component $a_k$="0" is encountered (exit branch Y of decision block 955), the corresponding PSC PSCk (together with the associated set of 15 secondary scrambling codes) is assigned to the cell Ci (block 960).

The loop counter i is increased by one (block 965), and the operation flow jumps back to block 940 (connector J2); a new cell Ci is selected and processed in the way described above, unless all the cells of the set C have already been processed (decision block 970), in which case the procedure ends.

If on the contrary no component $a_k$="0" is found (exit branch N of decision block 955), it is decreed that the assignment of scrambling code to the cell Ci is impossible because the basic re-use constraint cannot be satisfied (block 995). The procedure then ends.

At the end of the procedure, a respective PSC (and the associated SSCs) is assigned to each cell in the area under planning, unless the procedure ended for impossibility of assigning the scrambling codes satisfying the re-use requirement.

In case of impossibility of assigning to one or more cells the scrambling codes satisfying the re-use requirement, the algorithm may assign to these cells a particular code external to the set of codes previously considered.

That described above is merely an exemplary PSC assignment method that allows allocating PSCs (in downlink) to the network cells; other PSC assignment methods are obviously possible.

Figure 10:
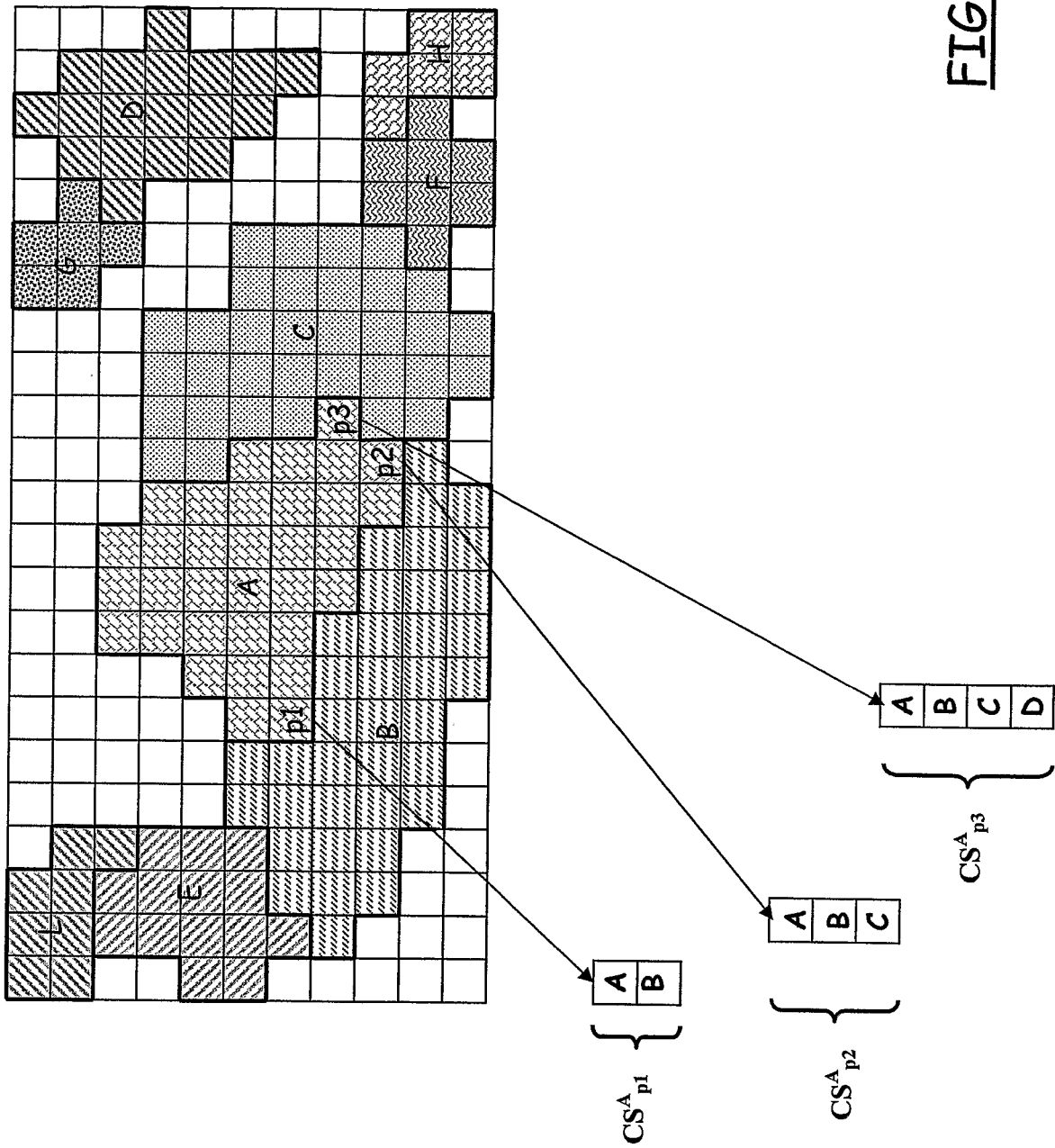
FIG. 10 schematically shows an example of best server areas of a group of cells of a network.

With reference to FIG. 10, an example is described hereinafter aimed at exemplifying, in a simple case, the operation of the method according to an embodiment of the invention.

In particular, let it be assumed that, in a generic network area, nine cells A, B, C, D, E, F, G, H and L are present; the areas with different type of shadings and delimited by wider lines represent the best server areas in respect of the nine cells A, B, C, D, E, F, G, H and L.

Let it also be assumed that the criterion adopted to build the neighboring sets of the cells is a purely geometrical one; in this case, considering the first-order adjacent cells, $NBR_A=\{B, C\}$, $NBR_B=\{A,C,E\}$, $NBR_C=\{A,B,F\}$, $NBR_D=\{G\}$, $NBR_E=\{B,L\}$, $NBR_F=\{C,H\}$, $NBR_G=\{D\}$, $NBR_H=\{_H\}$, and $NBR_L=\{_E\}$. It is observed that the cell D is not adjacent to any one of the cells A, B and C.

Let three pixels p1, p2 and p3 in the best server area of the cell A be considered; let it be assumed that the candidate set of the pixel p1 include the cells A and B, the candidate set of the pixel p2 includes the cells A, B and C, and the candidate set of the pixel p3 includes the cells A, B, C and D; thus, even if the cell D has not been declared adjacent to the cell A, its signal can be received in the pixel p3. In the drawing, the order, from top to bottom, of the cells listed in the candidate set of the generic one of the three pixels considered reflects the (decreasing) order of the power level of the respective CPICH as received in that pixel.

In this example, according to the method described above, the following operations are performed for the determination of the set INTERFj in respect of the generic cell Cj, and limitedly for simplicity to the three considered pixels p1, p2 and p3.

The components $N(i,j)$ and $N(i)$, with i,j in the set (A,B,C, D) are first initialized:

$$N(A,B)=N(B,C)=N(A,C)=N(A,D)=N(B,D)=N(C,D)=0;$$
$$D(A)=D(B)=D(C)=D(D)=0.$$

Let it be assumed, for the sake of simplicity, that $T_{eq}(m,n)=1$ for every pixel p1, p2 and p3.

Let it also be assumed, for the sake of simplicity, that the three pixels p1, p2 and p3 are the only pixels, in the best-server area (calculated on the basis of the CPICH power level) of the cell A, having a candidate set including more than one (i.e., the beset server) cell. The calculation gives:

Pixel p1:
$N(A,B)=N(A,B)=\delta_{A,B}(1)=\delta_{A,B}(1)$
$N(B,A)=N(B,A)+\delta_{B,A}(1)=\delta_{B,A}(1)$
$D(A)=D(A)+1=1$
$D(B)=D(B)+1=1$ Pixel p2:
$N(A,B)=N(A,B)+\delta_{A,B}(2)=\delta_{A,B}(1)+\delta_{A,B}(2)$
$N(B,A)=N(B,A)+\delta_{B,A}(2)=\delta_{B,A}(1)+\delta_{B,A}(2)$
$N(A,C)=N(A,C)+\delta_{A,C}(2)=\delta_{A,C}(2)$
$N(C,A)=N(C,A)+\delta_{C,A}(2)=\delta_{C,A}(2)$
$N(B,C)=N(B,C)+\delta_{B,C}(2)=\delta_{B,C}(2)$
$N(C,B)=N(C,B)+\delta_{C,B}(2)=\delta_{C,B}(2)$
$D(A)=D(A)+1=2$
$D(B)=D(B)+1=2$
$D(C)=D(C)+1=2$ Pixel p3:
$N(A,B)=N(A,B)+\delta_{A,B}(3)=\delta_{A,B}(1)+\delta_{A,B}(2)+\delta_{A,B}(3)$
$N(B,A)=N(B,A)+\delta_{B,A}(3)=\delta_{B,A}(1)+\delta_{B,A}(2)+\delta_{B,A}(3)$
$N(A,C)=N(A,C)+\delta_{A,C}(3)=\delta_{A,C}(2)+\delta_{A,C}(3)$
$N(C,A)=N(C,A)+\delta_{C,A}(3)=\delta_{C,A}(2)+\delta_{C,A}(3)$
$N(B,C)=N(B,C)+\delta_{B,C}(3)=\delta_{B,C}(2)+\delta_{B,C}(3)$
$N(C,B)=N(C,B)+\delta_{C,B}(3)=\delta_{C,B}(2)+\delta_{C,B}(3)$
$N(A,D)=N(A,D)+\delta_{A,D}(3)=\delta_{A,D}(3)$
$N(D,A)=N(D,A)+\delta_{D,A}(3)=\delta_{D,A}(3)$
$N(B,D)=N(B,D)+\delta_{B,D}(3)=\delta_{B,D}(3)$
$N(D,B)=N(D,B)+\delta_{D,B}(3)=\delta_{D,B}(3)$
$N(C,D)=N(C,D)+\delta_{C,D}(3)=\delta_{C,D}(3)$
$N(D,C)=N(D,C)+\delta_{D,C}(3)=\delta_{D,C}(3)$
$D(A)=D(A)+1=3$
$D(B)=D(B)+1=3$
$D(C)=D(C)+1=2$
$D(D)=D(D)+1=1$ It is observed that, by definition of the term $\delta_{a,b}(m,n)$, it results $N(i_j)=N(j,i)$.

For each pair of cells which together belong to the candidate set of at least one of the three pixels p1, p2 and p3, the corresponding adjacency coefficient is calculated as indicated below:

$$C(A, B) = \frac{N(A, B)}{D(A)} = \frac{\delta_{A,B}(1) + \delta_{A,B}(2) + \delta_{A,B}(3)}{3}$$

$$C(B, A) = \frac{N(B, A)}{D(B)} = \frac{\delta_{A,B}(1) + \delta_{A,B}(2) + \delta_{A,B}(3)}{3}$$

$$C(A, C) = \frac{N(A, C)}{D(A)} = \frac{\delta_{A,C}(2) + \delta_{A,C}(3)}{3}$$

$$C(C, A) = \frac{N(C, A)}{D(C)} = \frac{\delta_{A,C}(2) + \delta_{A,C}(3)}{2}$$

-continued $$C(A, D) = \frac{N(A, D)}{D(A)} = \frac{\delta_{A,D}(3)}{3}$$

$$C(D, A) = \frac{N(D, A)}{D(D)} = \frac{\delta_{A,D}(3)}{1}$$

$$C(B, C) = \frac{N(B, C)}{D(B)} = \frac{\delta_{B,C}(2) + \delta_{B,C}(3)}{3}$$

$$C(C, B) = \frac{N(C, B)}{D(C)} = \frac{\delta_{B,C}(2) + \delta_{B,C}(3)}{2}$$

$$C(B, D) = \frac{N(B, D)}{D(B)} = \frac{\delta_{B,D}(3)}{3}$$

$$C(D, B) = \frac{N(D, B)}{D(D)} = \frac{\delta_{B,D}(3)}{1}$$

$$C(C, D) = \frac{N(C, D)}{D(C)} = \frac{\delta_{C,D}(3)}{2}$$

$$C(D, C) = \frac{N(D, C)}{D(D)} = \frac{\delta_{C,D}(3)}{1}$$

Assuming that the adjacency coefficient threshold ADJ-Thr is set to 0, the sets INTERF$_A$, INTERF$_B$, INTERF$_C$ for the three cells A, B and C after the analysis of the pixels belonging to the best server area of the cell A are:
INTERF$_A$={B,C,D}
INTERF$_B$={A,C,D}
INTERF$_C$={A,B,D}

The sets of the first-order, second-order and third-order adjacent cells (which only depend on the construction of the neighboring sets NBRj of the various cells) are the following:
NBR_FIRST_ORDER$_A$=NBR$_A$={B,C}
NBR_FIRST_ORDER$_B$=NBR$_B$={A,C,E}
NBR_FIRST_ORDER$_C$=NBR$_C$={A,B,F}
NBR_SECOND_ORDER$_A$=NBR$_A$*NBR$_A$={B,C,E,F}
NBR_SECOND_ORDER$_B$=NBR$_B$*NBR$_B$={A,C,E,L}
NBR_SECOND_ORDER$_C$=NBR$_C$*NBR$_C$={A,B,F,H}
NBR_THIRD_ORDER$_A$=NBR$_A$*NBR$_A$*NBR$_A$={B,C,E,F,H,L}
NBR_THIRD_ORDER$_B$=NBR$_B$*NBR$_B$*NBR$_B$={A,C,E,L,F}
NBR_THIRD_ORDER$_C$=NBR$_C$*NBR$_C$*NBR$_C$={A,B,F,E,H}

It can be observed that, in general, the set of cells which are adjacent of the (N+1) order to a generic cell include the cells which are adjacent of the N order to that cell.

For the three cells A, B and C considered in this example, it is:
ADJ[A]=NBR_THIRD_ORDER$_A$+NBR$_A$*INTERF$_A$*NBR$_A$={B,C,E,F,H,L,D}
ADJ[B]=NBR_THIRD_ORDER$_B$+NBR$_B$*INTERF$_B$*NBR$_B$={A,C,E,L,F,D}
ADJ[C]=NBR_THIRD_ORDER$_A$+NBR$_C$*INTERF$_C$*NBR$_C$={A,B,F,E,H,D}

Thus, it can be seen that by taking into account, in the construction of the sets ADJ[j], of the "interferentially adjacent" cells, i.e., the cells belonging to the sets INTERFj built in the way described, the cell D has been included in the sets ADJ[A], ADJ[B], ADJ[C]. This is very important, because in at least one pixel (the pixel p3) of the best server area of the cells A, the generic mobile terminal may receive the signal of the cell D; not including the cell D in the sets ADJ[A], ADJ[B], ADJ[C], on which basis the PSCs are assigned to the different cells, might cause the cell D to be assigned a same PSC as the cells A, B, C, with a consequent malfunctioning of the system, and possible call drops.

§§§§§

The present invention, an embodiment of which has been described in the foregoing, provides a method by which it is possible to determine, for the generic cell of a network area under planning, a set of neighborhood relationships with other cells such that using the thus determined set of neighborhood relationships for uniquely assigning PSCs, it is ensured that the soft-handover conditions are properly managed, because cells that will possibly be in macrodiversity with other cells are properly identified, so they can be assigned a unique PSC.

Although the present invention has been disclosed and described by way of some embodiments, it is apparent to those skilled in the art that several modifications to the described embodiments, as well as other embodiments of the present invention are possible without departing from the spirit or essential features thereof/the scope thereof as defined in the appended claims

What is claimed is:

1. A method for assigning scrambling codes in a code division multiple access cellular radio communications network comprising a plurality of network cells covering a geographic area, comprising:
   determining, for each given cell of said plurality of network cells, a respective set of adjacent cells, comprising:
      taking a first set of cells that are neighbors of the given cell,
      taking a second set of cells that are neighbors of neighbors of the given cell,
      taking a third set of cells that are neighbors of neighbors of neighbors of the given cell,
      taking a fourth set of cells which, in at least one point of the geographic area, together with the given cell, produce respective signal powers higher than a predetermined threshold;
      combining the first, second, third, and fourth set of cells, and
   wherein two cells are considered neighbors in case the respective coverage areas at least partially overlap; and
   assigning to each cell of the set of adjacent cells a scrambling code different from a scrambling code assigned to the given cell,
      wherein said taking a fourth set of cells comprises:
         calculating a mutual difference in respective signal powers of the given cell and a cell of the fourth set of cells,
         calculating a weight factor from the calculated mutual difference, and
         calculating a cumulative weight factor by adding the weight factor for all the points of the geographic area in which the cell of the fourth set of cells and the given cell produce respective signal powers higher than the predetermined threshold.

2. The method according to claim 1, further comprising calculating a number of points of the geographic area in which the signal power of the given cell and of least another cell of said plurality exceeds the predetermined threshold.

3. The method according to claim 2, further comprising calculating an adjacency coefficient by normalizing said cumulated weight factor by the calculated number of points.

4. The method according to claim 3, wherein said taking a fourth set of cells comprises:
   setting a predetermined adjacency threshold; and
   taking the cells of said fourth set of cells for which the respective adjacency coefficient exceeds that adjacency threshold.

5. The method according to claim 1, wherein said calculating the weight factor comprises taking into account an indication of traffic offered to said point of the geographic area.

6. The method according to claim 2, wherein said calculating the number of points of the geographic area comprises taking into account an indication of traffic offered to said point of the geographic area.

7. A data processing system for assigning scrambling codes in a code division multiple access cellular radio communications network comprising a plurality of network cells covering a geographic area, comprising means configured to:
   determine, for each given cell of said plurality of network cells, a respective set of adjacent cells, said set of adjacent cells comprising:
      a first set of cells that are neighbors of the given cell,
      a second set of cells that are neighbors of neighbors of the given cell,
      a third set of cells that are neighbors of neighbors of neighbors of the given cell,
      a fourth set of cells which, in at least one point of the geographic area, together with the given cell, produce respective signal powers higher than a predetermined threshold,
   combine the first, second, third, and fourth set of cells, and
   wherein two cells are considered neighbors in case the respective coverage areas at least partially overlap; and
   assign, to each cell of the set of adjacent cells a scrambling code different from a scrambling code assigned to the given cell,
      wherein said fourth set of cells is determined by:
         calculating a mutual difference in respective signal powers of the given cell and a cell of the fourth set of cells,
         calculating a weight factor from the calculated mutual difference, and
         calculating a cumulative weight factor by adding the weight factor for all the points of the geographic area in which the cell of the fourth set of cells and the given cell produce respective signal powers higher than the predetermined threshold.

8. A non-transitory computer readable medium encoded with a computer program directly loadable into a memory of a computer system and comprising computer program instructions, which, when executed by a computer system, cause the computer system to perform the steps of the method according to claim 1.

* * * * *